US005398643A

United States Patent [19]
McElrath et al.

[11] Patent Number: 5,398,643
[45] Date of Patent: Mar. 21, 1995

[54] AUTOMATIC EXTRUSION ANIMAL FEEDER

[76] Inventors: David E. McElrath; Pamela S. Borah, both of 1705 Lynn Way, Louisville, Ky. 40222

[21] Appl. No.: 964,275

[22] Filed: Oct. 21, 1992

[51] Int. Cl.⁶ .............................................. A01K 5/02
[52] U.S. Cl. ............................. 119/51.11; 119/57.92; 222/642; 222/650
[58] Field of Search ................ 119/51.01, 51.11, 57.92; 241/82.1; 222/319, 384, 409, 642, 650

[56] References Cited

U.S. PATENT DOCUMENTS

| | | | |
|---|---|---|---|
| 2,617,560 | 11/1952 | Pietrzak | 222/340 |
| 3,982,667 | 9/1976 | Chen | 222/642 |
| 4,334,636 | 6/1982 | Paul | 222/642 |
| 4,665,862 | 5/1987 | Pitchford, Jr. | 119/51.11 |
| 4,978,042 | 12/1990 | Fidler | 222/642 |
| 5,129,361 | 7/1992 | Deutsch et al. | 119/51.12 |

FOREIGN PATENT DOCUMENTS

| | | | |
|---|---|---|---|
| 2503275 | 10/1982 | France | 119/57.92 |
| 6707371 | 11/1967 | Netherlands | 119/51.11 |

Primary Examiner—Robert P. Swiatek

[57] ABSTRACT

A device for feeding animals moist and semi-moist food at selected times including a tubular casing having a convergent outlet and an open inlet. An extrusion assembly including a piston longitudinally movable in the tubular casing is provided and sized to be received in the tubular casing to travel a portion of the length thereof. A drive arrangement is provided to extend the piston into the tubular casing to extrude food through the outlet at selected intervals and for removing the piston from the tubular casing for refilling the tubular casing. Interval operational timing devices are provided for selecting the frequency and duration of the operation of the feeding cycles and can be operated by programmable time control devices. Additionally, solid state heating/cooling devices can be provided so that the food extruded from the tubular casing can be heated or cooled as desired for emission from the feeder.

9 Claims, 2 Drawing Sheets

AUTOMATIC EXTRUSION ANIMAL FEEDER

FIELD OF THE INVENTION

The present invention relates in general to animal feeding devices and in particular relates to pet feeding devices.

BACKGROUND OF THE INVENTION

Numerous prior art arrangements are known for automatically providing feed for animals, including pets, without attendance of a human being. Such devices have been developed to accomplish specific objectives and in some instances have been adapted to provide both food and water.

In general, all prior art devices have been designed to provide for the regular emission of granular foods to a feeding area. In some instances the food is provided at a regular, rather slow, rate and in other instances the food has been provided in preselected quantities at regular intervals.

In most prior art arrangements where the food is provided at intervals provision is made for the adjustment of the quantity of food provided in each feeding cycle and the frequency at which the food is provided.

In systems where the food is provided continuously the prior art has provided for adjustment of the rate of emission of the food. The prior art devices have in general provided only for supplying dry granular food and not moist or semi-moist food.

In general, moist and semi-moist pet food cannot be exposed to the atmosphere for even short periods of time because the loss of moisture which occurs rapidly degrades the food and makes it unusable. Further, the food cannot even be used in the prior art feeding devices since the consistency of the food precludes free fall through the feeding mechanisms as with dry granular foods.

Many animals, particularly older animals with bad teeth and animals with particular disabilities require moist and semi-moist food. Owners of such pets cannot use other available automatic feeding devices and must in some cases make cumbersome, usually unsatisfactory, and sometimes expensive arrangements for feeding their pets when they are away from home, even for short periods of time.

The problems associated with feeding moist and semi-moist food is particularly aggravated with animals with feeding disorders such as bolemia.

No prior art arrangement is known which allows regular feeding of moist nongranular animal food at selected intervals.

SUMMARY OF THE INVENTION

The present invention relates to methods and apparatus for providing regular rations of moist and semi-moist nongranular pet food such as cat food over a selected period of time.

In accordance with one feature of the present invention it is recognized that automatic feeding of moist and semi-moist food unique situations must be dealt with which are not encountered in feeding dry granular feed.

The present invention utilizes an extrusion device where the food is loaded into a tubular casing with an open end and is then extruded through a convergent nozzle in the opposite end by movement of a piston like element along the longitudinal axis of the tubular element. The tubular element is closed except for the convergent extrusion opening and excludes air from the contact with the food so prevents degradation except after the food is emitted from the feeding device. Presumably the food is eaten within a reasonable time and therefore does not spoil before it is eaten.

Devices within the scope of the present invention are economically fabricated and are highly effective.

Moreover, devices within the scope of the present invention can be used to overcome problems associated with feeding moist and semi-moist food from other devices for automatically feeding pet food.

A device for feeding animals moist and semi-moist food at selected intervals including a tubular casing having a convergent outlet and an open inlet. An extrusion assembly including a piston longitudinally movable in the tubular casing is provided and sized to be received in the tubular casing to travel a portion of the length thereof. A drive arrangement is provided to extend the piston into the tubular casing to extrude food through the outlet at selected intervals and for removing the piston from the tubular casing for refilling the tubular casing. Interval and operational timing devices are provided for selecting the frequency and duration of the operation of the feeding cycles and can be operated by programmable time control devices. Additionally, solid state heating/cooling devices can provided so that the food extruded from the tubular casing can be heated or cooled as desired for emission from the feeder.

An example of a device within the scope of the present invention is illustrated in the accompanying drawings and described hereinafter but it will be understood that neither the drawings nor the descriptions thereof are by way of limitation and that other arrangements also within the scope of the present invention will occur to those skilled in the art upon reading the disclosure set forth hereinafter.

BRIEF DESCRIPTION OF THE DRAWINGS

In the example of an arrangement within the scope of the present shown in the accompanying drawings.

All as described in more detail hereinafter . . .

DETAILED DESCRIPTION OF THE DRAWINGS

Figure 1:
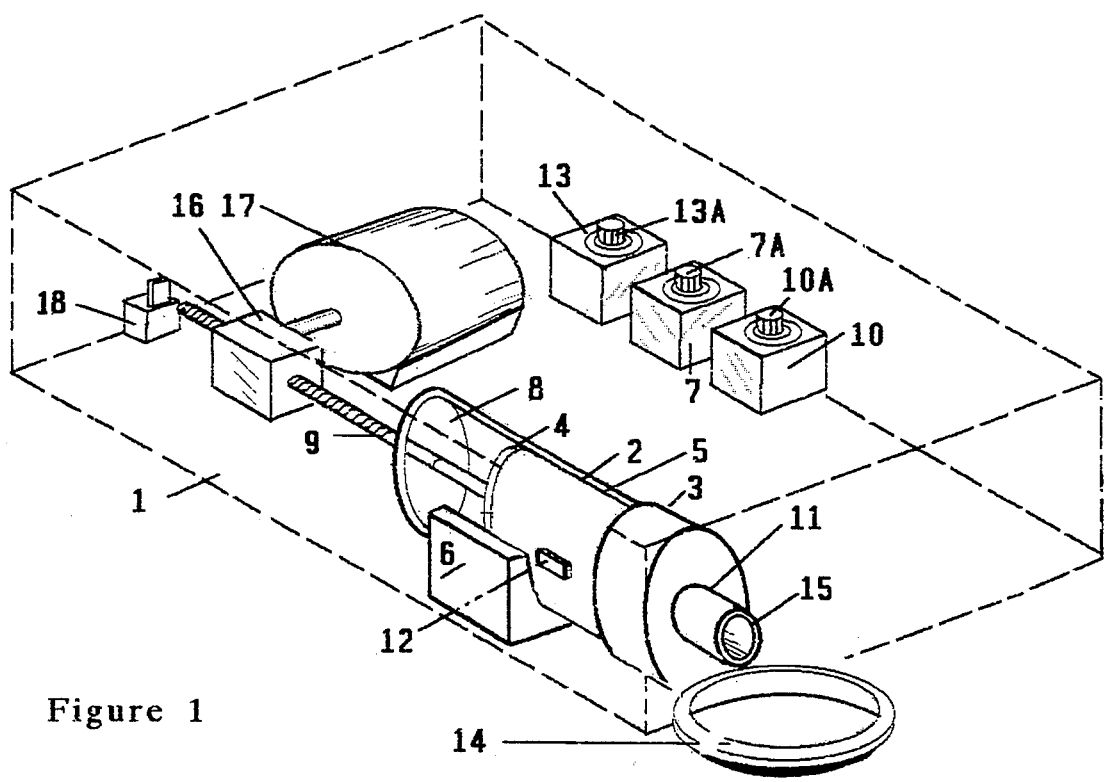
FIG. 1 is a perspective view, partially in section, of an example of an arrangement within the scope of the present invention.
Figure 2:
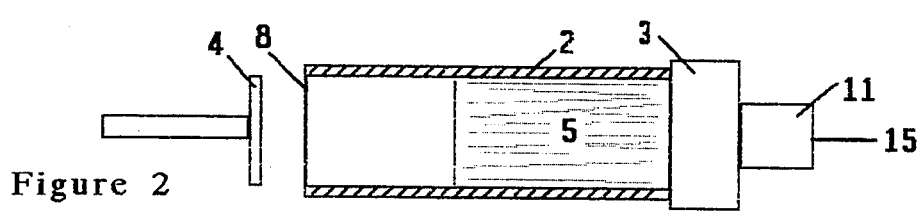
FIG. 2 is an elevational view of the extrusion device of the arrangement shown in FIG. 1.

One example of an arrangement within the scope of the present invention is illustrated in the accompanying drawings where FIG. 1 illustrates various elements in an enclosure 1 shown in dashed lines. The enclosure can be of any convenient suitable configuration, size and material of construction depending on the application and the size of the elements. The size of the elements will be determined principally by the quantity of food to be delivered during a selected period of time and the number of times the unit is to be operated during a given time period.

In the arrangement shown in FIG. 1 a tubular casing 2 is located on a support 6 which holds the casing in place and allows removal of the tubular casing and filling after the completion of a filling cycle.

As shown, an endcap 3 can be provided and has an outlet, for example a nozzle 11, which extends outwardly from the endcap through the wall 1 of the enclosure and has an outlet 15 for emission of food. Food emitted from the outlet 15 is supplied to a dish 14 where it can be eaten by the animal to be fed.

In accordance with one feature of the present invention tubular casing 2 is also provided with an opening 8 adapted to receive a piston 4 which is in turn adapted to be moved longitudinally through casing 2 and act as an extruder to force food 5 out through opening 15 of nozzle 11.

Advantageously, the food 5 is excluded from exposure to the atmosphere by the piston 4 so that the food does not dry out before it is extruded through opening 15 to the dish 14.

In the example shown in FIG. 1 piston 4 is advanced and retracted by a lead screw 9 which is advanced and retracted through a gear box 16 by a motor 17 as is known in the art. Motor 17 can advantageously be a bi-directionally operated motor so that as it is rotated in a first direction the piston 4 is advanced into tubular casing 2 and as the motor is rotated in the opposite direction the piston is retracted from the tubular casing.

Figure 3A:
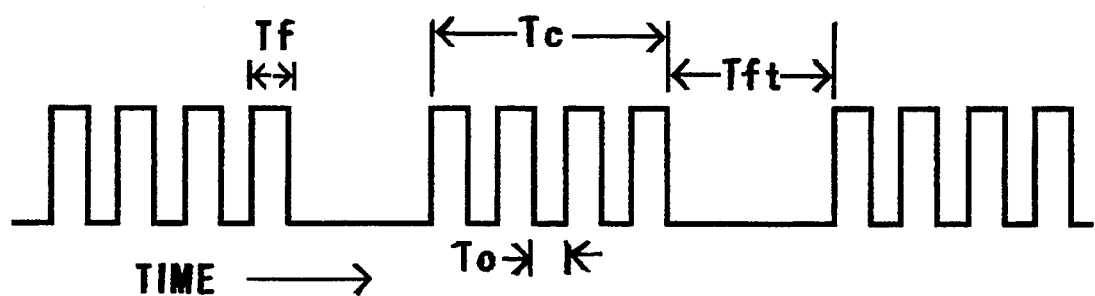
FIG. 3A illustrates graphically one aspect of operation of the device illustrated in FIGS. 1 and 2; and, FIG. 3B is a graphical illustration of another aspect of operation of a device of the type shown in the Figures.
Figure 3B:
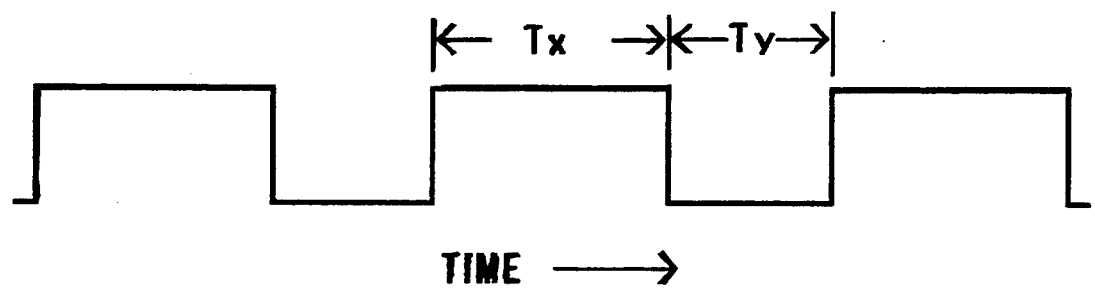

Typically, the piston is advanced during a feeding cycle where the motor may be actuated and turned off several times to feed a total desired quantity of food at selected intervals so that food is available in selected portions at selected time intervals as shown in FIGS. 3A and 3B. Upon completion of the feeding when, the piston has been extended into the tubular casing, the motor rotation is reversed and the piston retracted from the tubular casing so the casing can be cleaned and refilled.

A limit switch 18 can be provided to prevent overtravel of the lead screw 9 so that the motor is turned off when shaft 9 strikes the limit switch. Limit switch 18 is, of course, located so that piston 4 has been fully withdrawn before limit switch 18 is activated. A mechanical limit switch is illustrated in the drawings but it will be understood that solid state or other stroke limiting means can be provided within the scope of the present invention.

Operation of motor 17 determines the frequency of duration of the feeding cycles and motor 17 can be controlled by various means. In the example of FIG. 1, motor operation is sequenced by controller/timers 7 and 13.

Discrete timer elements are shown in the Figures for clarity but it will be understood that within the scope of the present invention the discrete timers/controllers can be replaced with a programmable controller as known in the art and not shown in detail here where all of the timing and operating functions can be programmed to provide highly selective operating characteristics.

In the arrangement shown in FIG. 1, controller 7 would typically determine the interval between feeding periods. The desired time interval between feeding periods is set by means of an adjusting knob 7A on the timer/controller as is known in the art.

The amount of feed to be provided during each operating period of the motor is determined by the time the motor is on as well as the rate of rotation of the shaft 9 which can be established by the rotational speed of the motor or the degree of reduction provided in gear box 16. The "run" time is set by a timer/controller 13 by means of adjusting knob 13A.

As shown in FIGS. 3A and 3B a wide variety of feeding sequences is available. In FIG. 3A, several supply periods when the motor is running are provided within each feeding period Tc. The supply periods have a time of To with a time pause Tf between supply periods To. Each feeding period is composed of the several supply periods and pauses and has a total time Tc. There is then a selected time interval Tft between each feeding period To.

FIG. 3B illustrates another example of a characteristic feeding function. In this case the supply periods are continuous for a time Tx so the feeding period and the supply period are equal in contrast with the example shown in FIG. 3A. There is an interval Ty between each feeding period.

The overall feeding time including all of the feeding periods is determined by the controls and can include the rate of feed during each supply period and the length of the intervals between supply periods and feeding periods. While not illustrated, it will be understood that it is within the scope of the present invention to include a real time clock and to allow the rate of feed to be adjusted by the time of day by adjusting, for example the speed of rotation of motor 17 using solid state circuitry.

Once the feeding cycle is completed and the tubular casing is to be recharged it is necessary to reverse the motor 17 and back the piston 4 out of the tubular casing 2. Switch 10 is provided to have a spring loaded operator 10A so that operator 10A is actuated until the piston 4 has cleared the end of the tubular casing and then released or limit switch 18 is contacted to stop operation of the motor.

The tubular casing can then be removed from the enclosure for cleaning and recharging.

In some instances it may be desirable to heat or cool the food In such cases a heating or cooling means can be provided and the arrangement shown in FIG. 1 includes a solid state thermal means 12 such as a Peltier chip where a side of the element is exposed to the tubular casing 2 to heat or cool the material in the tubular casing depending on which direction a direct current is imposed on the element to correspondingly heat or cool the material emitted from nozzle 11. The current is applied to the Peltier element as required to maintain the temperature of the food until it is extruded.

It will be understood that the foregoing is but one example of an arrangement within the scope of the present invention and that other arrangements also within the scope of the present invention will occur to those skilled in the art upon reading the disclosure set forth hereinafter.

The invention claimed is:

1. A device for feeding animals moist food at regular intervals including: tubular casing means having a restricted outlet and an open inlet in axial alignment with said outlet for receiving food into said tubular casing; extrusion means including piston means sized to be received in said tubular casing to travel a portion of the length thereof; motor means to extend the piston into said tubular casing to extrude food through said outlet and to move said piston from said tubular casing for refilling said tubular casing; and timing means with preset means to operate said motor means at selected intervals for selected time periods and terminate operation of said motor means at the expiration of said selected time periods.

2. The invention of claim 1 wherein said timing means includes programmable control means whereby operation of said motor at desired real times can be selected.

3. The invention of claim 1 wherein said motor is operated for selected first operating time periods with first off time periods between said operating time periods.

4. The invention of claim 3 wherein said motor is operated for selected numbers of said first operating time and off time periods and then said motor is off for second off time periods.

5. The invention of claim 3 wherein said first operating time period and said first off time periods are of shorter duration than said second off time period.

6. The invention of claim 1 including temperature adjustment means to maintain food in said tubular casing within a selected temperature range.

7. The invention of claim 6 wherein said temperature adjustment means includes solid state thermal element heating and cooling means operated by an electrical power supply source.

8. The invention of claim 7 wherein said electrical supply source provides direct current electricity and said solid state thermal element heats said food when electrical current is passed through said element in one direction and cools said food when electrical current is passed through said element in another direction.

9. The invention of claim 1 including limit switch means to limit the extent of travel of said piston in said tubular casing.

* * * * *